(12) United States Patent
Kasai

(10) Patent No.: US 11,603,198 B2
(45) Date of Patent: Mar. 14, 2023

(54) SIMULATOR, CONTROL DEVICE, AND NON-TRANSITORY COMPUTER-READABLE RECORDING MEDIUM

(71) Applicant: OMRON Corporation, Kyoto (JP)

(72) Inventor: Kazuki Kasai, Tokyo (JP)

(73) Assignee: OMRON Corporation, Kyoto (JP)

( * ) Notice: Subject to any disclaimer, the term of this patent is extended or adjusted under 35 U.S.C. 154(b) by 437 days.

(21) Appl. No.: 16/611,481

(22) PCT Filed: Jul. 17, 2018

(86) PCT No.: PCT/JP2018/026725
§ 371 (c)(1),
(2) Date: Nov. 7, 2019

(87) PCT Pub. No.: WO2019/026608
PCT Pub. Date: Feb. 7, 2019

(65) Prior Publication Data
US 2021/0139143 A1 May 13, 2021

(30) Foreign Application Priority Data
Aug. 4, 2017 (JP) .............................. JP2017-151840

(51) Int. Cl.
*B64C 39/02* (2006.01)
*B65G 1/137* (2006.01)

(52) U.S. Cl.
CPC .......... *B64C 39/024* (2013.01); *B65G 1/1371* (2013.01); *B65G 1/1373* (2013.01); *B64C 2201/066* (2013.01); *B64C 2201/126* (2013.01); *B64C 2201/128* (2013.01); *B64C 2201/141* (2013.01)

(58) Field of Classification Search
None
See application file for complete search history.

(56) References Cited

U.S. PATENT DOCUMENTS

| 9,387,928 B1 | 7/2016 | Gentry et al. | |
|---|---|---|---|
| 2014/0035752 A1* | 2/2014 | Johnson | A01B 79/005 340/601 |
| 2017/0228845 A1* | 8/2017 | Mohr | G06Q 50/28 |

FOREIGN PATENT DOCUMENTS

| CN | 106156961 | 11/2016 |
|---|---|---|
| CN | 106363622 | 2/2017 |

(Continued)

OTHER PUBLICATIONS

"Delivery drones are coming: Jeff Bezos promises half-hour shipping with Amazon Prime Air" article written by David Pierce and published by "The Verge" on Dec. 1, 2013 https://www.theverge.com/2013/12/1/5164340/delivery-drones-are-coming-jeff-bezos-previews-half-hour-shipping (Year: 2013).*

(Continued)

*Primary Examiner* — Thomas E Worden
(74) *Attorney, Agent, or Firm* — JCIPRNET

(57) ABSTRACT

A technique for determining the number of appropriate work entities is implemented. A simulator includes: a transport capacity acquisition portion for acquiring the transport capacity of work entities; a load information acquisition portion; a map information acquisition portion; a work entity situation acquisition portion; and a number-of-work entities determination portion for determining the number of work entities.

12 Claims, 11 Drawing Sheets

(56) References Cited

FOREIGN PATENT DOCUMENTS

| | | | | |
|---|---|---|---|---|
| CN | 106662874 | 5/2017 | | |
| JP | H0844429 | 2/1996 | | |
| JP | H1153680 | 2/1999 | | |
| JP | 2003076821 | 3/2003 | | |
| JP | 2009080804 | 4/2009 | | |
| JP | 2010092321 | 4/2010 | | |
| JP | 2013086915 | 5/2013 | | |
| JP | 2013131064 | 7/2013 | | |
| JP | 2014026611 | 2/2014 | | |
| JP | 2014215849 | 11/2014 | | |
| KR | 20030047327 | 6/2003 | | |
| KR | 20090051354 | 5/2009 | | |
| KR | 20160019073 | 2/2016 | | |
| WO | WO-2016022646 A1 * | 2/2016 | ........... | B64C 39/024 |
| WO | 2016053194 | 4/2016 | | |
| WO | 2017090108 | 6/2017 | | |

OTHER PUBLICATIONS

"Office Action of Korea Counterpart Application" with English translation thereof, dated Jul. 25, 2021, p. 1-p. 14.
"International Search Report (Form PCT/ISA/210) of PCT/JP2018/026725," dated Sep. 18, 2018, with English translation thereof, pp. 1-5.
"Written Opinion (Form PCT/ISA/237) of PCT/JP2018/026725", dated Sep. 18, 2018, with English translation thereof, pp. 1-8.
Office Action of Korea Counterpart Application, with English translation thereof, dated Jan. 24, 2021, pp. 1-14.
Said Salhi et al., "The multi-depot vehicle routing problem with heterogeneous vehicle fleet: Formulation and a variable neighborhood search implementation", Computers & Operations Research, May 25, 2013, pp. 315-325.
"Search Report of Europe Counterpart Application", dated Mar. 29, 2021, p. 1-p. 10.
"Office Action of China Counterpart Application" with English translation thereof, dated Dec. 5, 2022, p. 1-p. 21.

* cited by examiner

| LOAD | WEIGHT(g) | Start POSITION | Goal POSITION |
|---|---|---|---|
| LOAD A | 400 | $P_{SA}$ | $P_{GA}$ |
| LOAD B | 1500 | $P_{SB}$ | $P_{GB}$ |
| LOAD C | 300 | $P_{SC}$ | $P_{GC}$ |

33

| WORK ENTITY | TRANSPORTABLE WEIGHT(g) | AMOUNT (YEN) | INITIAL POSITION |
|---|---|---|---|
| WORK ENTITY 1 | 2500 | 1500000 | $P_{S1}$ |
| WORK ENTITY 2 | 700 | 700000 | $P_{S2}$ |
| WORK ENTITY 3 | 300 | 300000 | $P_{S3}$ |

| PATTERN No. | WORK ENTITY 1 | WORK ENTITY 2 | WORK ENTITY 3 | REQUIRED TIME(s) | TOTAL AMOUNT (YEN) |
|---|---|---|---|---|---|
| 1 | 1 | 0 | 0 | 150 | 1500000 |
| 2 | 1 | 1 | 0 | 90 | 2200000 |
| 3 | 1 | 1 | 1 | 75 | 2500000 |
| 4 | 2 | 0 | 0 | 80 | 3000000 |
| 5 | 2 | 1 | 0 | 70 | 3700000 → SELECT |
| 6 | 2 | 1 | 1 | 70 | 4000000 |
| ⋮ | ⋮ | ⋮ | ⋮ | ⋮ | ⋮ |
| X | x | y | z | 70 | M |

| LOAD | Start POSITION | Goal POSITION |
|---|---|---|
| LOAD A | $P_{SA}$ | $P_{GA}$ |
| LOAD B | $P_{SB}$ | $P_{GB}$ |
| LOAD C | $P_{SC}$ | $P_{GC}$ |

| CHARGING STATION | POSITION |
|---|---|
| CHARGING STATION A | $P_{StA}$ |
| CHARGING STATION B | $P_{StB}$ |
| CHARGING STATION C | $P_{StC}$ |

FIG. 6a

| WORK ENTITY | USABLE OR NOT | USABLE TIME | USABLE POSITION | |
|---|---|---|---|---|
| WORK ENTITY 1 | UNUSABLE | AFTER 20 s | $P_{GA}$ | |
| WORK ENTITY 2 | UNUSABLE | AFTER 30 s | $P_{GB}$ | ⇒ SELECT |
| WORK ENTITY 3 | USABLE | AFTER 0 s | $P_{StC}$ | |

FIG. 6b

| PATTERN No. | COMBINATION No. | LOAD A | LOAD B | LOAD C | REQUIRED TIME |
|---|---|---|---|---|---|
| 1 | 1 | WORK ENTITY 1 | WORK ENTITY 1 | WORK ENTITY 1 | 60s |
| 2 | 2 | WORK ENTITY 1 | WORK ENTITY 1 | WORK ENTITY 1 | 60s |
| 3 | 2 | WORK ENTITY 1 | WORK ENTITY 1 | WORK ENTITY 2 | (55s) → SELECT |
| 4 | 2 | WORK ENTITY 1 | WORK ENTITY 1 | WORK ENTITY 3 | 70s |
| 5 | 3 | WORK ENTITY 1 | WORK ENTITY 1 | WORK ENTITY 1 | 60s |
| 6 | 3 | WORK ENTITY 2 | WORK ENTITY 1 | WORK ENTITY 2 | 75s |
| 7 | 4 | WORK ENTITY 1 | WORK ENTITY 1 | WORK ENTITY 1 | 65s |
| 8 | 4 | WORK ENTITY 2 | WORK ENTITY 1 | WORK ENTITY 1 | 70s |

FIG. 8

| PATTERN No. | COMBINATION No. | LOAD A | LOAD B | LOAD C | REQUIRED TIME |
|---|---|---|---|---|---|
| 1 | 1 | WORK ENTITY 1 | WORK ENTITY 1 | WORK ENTITY 1 | 60s |
| 2 | 2 | WORK ENTITY 1 | WORK ENTITY 1 | WORK ENTITY 1 | 60s |
| 3 | 2 | WORK ENTITY 1 | WORK ENTITY 1 | WORK ENTITY 2 | 55s |
| 4 | 2 | WORK ENTITY 1 | WORK ENTITY 1 | WORK ENTITY 3 | 70s |
| 5 | 3 | WORK ENTITY 1 | WORK ENTITY 1 | WORK ENTITY 1 | 60s |
| 6 | 3 | WORK ENTITY 2 | WORK ENTITY 1 | WORK ENTITY 2 | 75s |
| 7 | 4 | WORK ENTITY 1 | WORK ENTITY 1 | WORK ENTITY 1 | 65s |
| 8 | 4 | WORK ENTITY 2 | WORK ENTITY 1 | WORK ENTITY 1 | 70s |

| PATTERN No. | COMBINATION No. | PLURAL-LOAD TRANSPORTER | ACQUISITION SEQUENCE 1 | ACQUISITION SEQUENCE 2 | ACQUISITION SEQUENCE 3 | SINGLE-LOAD TRANSPORTER | TRANSPORT LOAD | REQUIRED TIME |
|---|---|---|---|---|---|---|---|---|
| 1-1 | 1 | WORK ENTITY 1 | LOAD A | LOAD B | LOAD C | NA | NA | 60s |
| 1-2 | 1 | WORK ENTITY 1 | LOAD A | LOAD C | LOAD B | NA | NA | 70s |
| 1-3 | 1 | WORK ENTITY 1 | LOAD B | LOAD A | LOAD C | NA | NA | 65s |
| 1-4 | 1 | WORK ENTITY 1 | LOAD B | LOAD C | LOAD A | NA | NA | 75s |
| 1-5 | 1 | WORK ENTITY 1 | LOAD C | LOAD A | LOAD B | NA | NA | 65s |
| 1-6 | 1 | WORK ENTITY 1 | LOAD C | LOAD B | LOAD C | NA | NA | 65s |

FIG. 9

SIMULATOR, CONTROL DEVICE, AND NON-TRANSITORY COMPUTER-READABLE RECORDING MEDIUM

CROSS-REFERENCE TO RELATED APPLICATION

This application is a 371 application of the International PCT application serial no. PCT/JP2018/026725, filed on Jul. 17, 2018, which claims the priority benefits of Japan Patent Application No. 2017-151840, filed on Aug. 4, 2017. The entirety of each of the above-mentioned patent applications is hereby incorporated by reference herein and made a part of this specification.

BACKGROUND

Technical Field

An aspect of the disclosure relates to a simulator, a control device, and a simulation program.

Background Art

In the related art, technologies for transporting a load in a warehouse are known. Patent Literature 1 discloses a technology of sorting sorted goods using a robot. Patent Literature 2 discloses a technology for allocating charging work to unmanned transport trucks that transport articles manufactured in a production line. Patent Document 3 discloses a technology for planning movement sections of a plurality of movement robots.

CITATION LIST

Patent Literature

[Patent Literature 1]
Japanese Patent Laid-Open No. 2013-86915 (disclosed on May 13, 2013)
[Patent Literature 2]
Japanese Patent Laid-Open No. 2010-92321 (disclosed on Apr. 22, 2010)
[Patent Literature 3]
Japanese Patent Laid-Open No. 2009-80804 (disclosed on Apr. 16, 2009)

SUMMARY

Technical Problem

To estimate necessary capital investment for new installation, extension, or the like of a warehouse or the like, it is preferable to calculate the number of appropriate work entities such as robots or people (workers) in advance.

An aspect of the disclosure provides a technology capable of determining the number of appropriate work entities.

Solution to Problem

To solve the foregoing problem, according to Aspect 1 of the disclosure, a simulator includes: a transport capacity acquisition portion configured to acquire a transport capacity of a work entity including a condition of a load which the work entity is able to transport; a load information acquisition portion configured to acquire load information regarding each load; a map information acquisition portion configured to acquire map information; a work entity situation acquisition portion configured to acquire a work entity situation including virtual positional information of each work entity; and a number-of-work entities determination portion configured to determine the number of work entities to satisfy a predetermined condition with reference to the transport capacity of the work entity, the load information, the map information, and the work entity situation.

To solve the foregoing problem, according to Aspect 14 of the disclosure, a control device includes: a transport capacity acquisition portion configured to acquire a transport capacity of a work entity including a condition of a load which the work entity is able to transport; a load information acquisition portion configured to acquire load information regarding each load; a map information acquisition portion configured to acquire map information; a work entity situation acquisition portion configured to acquire a work entity situation including virtual positional information of each work entity; a number-of-work entities determination portion configured to determine the number of work entities to satisfy a predetermined condition with reference to the transport capacity, the load information, the map information, and the work entity situation; and a control portion configured to control a work entity with reference to a determination result regarding the work entity.

Advantageous Effects of Invention

According to an aspect of the disclosure, it is possible to realize a technology capable of determining the number of appropriate work entities.

BRIEF DESCRIPTION OF DRAWINGS

FIGS. 3a and 3b are diagrams illustrating a first overview of a transport pattern calculation example according to the first embodiment of the disclosure.

FIGS. 4a and 4b are diagrams illustrating a first transport pattern calculation example according to the first embodiment of the disclosure.

FIGS. 6a and 6b are diagrams illustrating the second transport pattern calculation example according to the first embodiment of the disclosure.

FIG. 8 is a diagram illustrating the third transport pattern calculation example according to the first embodiment of the disclosure.

FIG. 9 is a diagram illustrating the third transport pattern calculation example according to the first embodiment of the disclosure.

DESCRIPTION OF EMBODIMENTS

Figure 1:
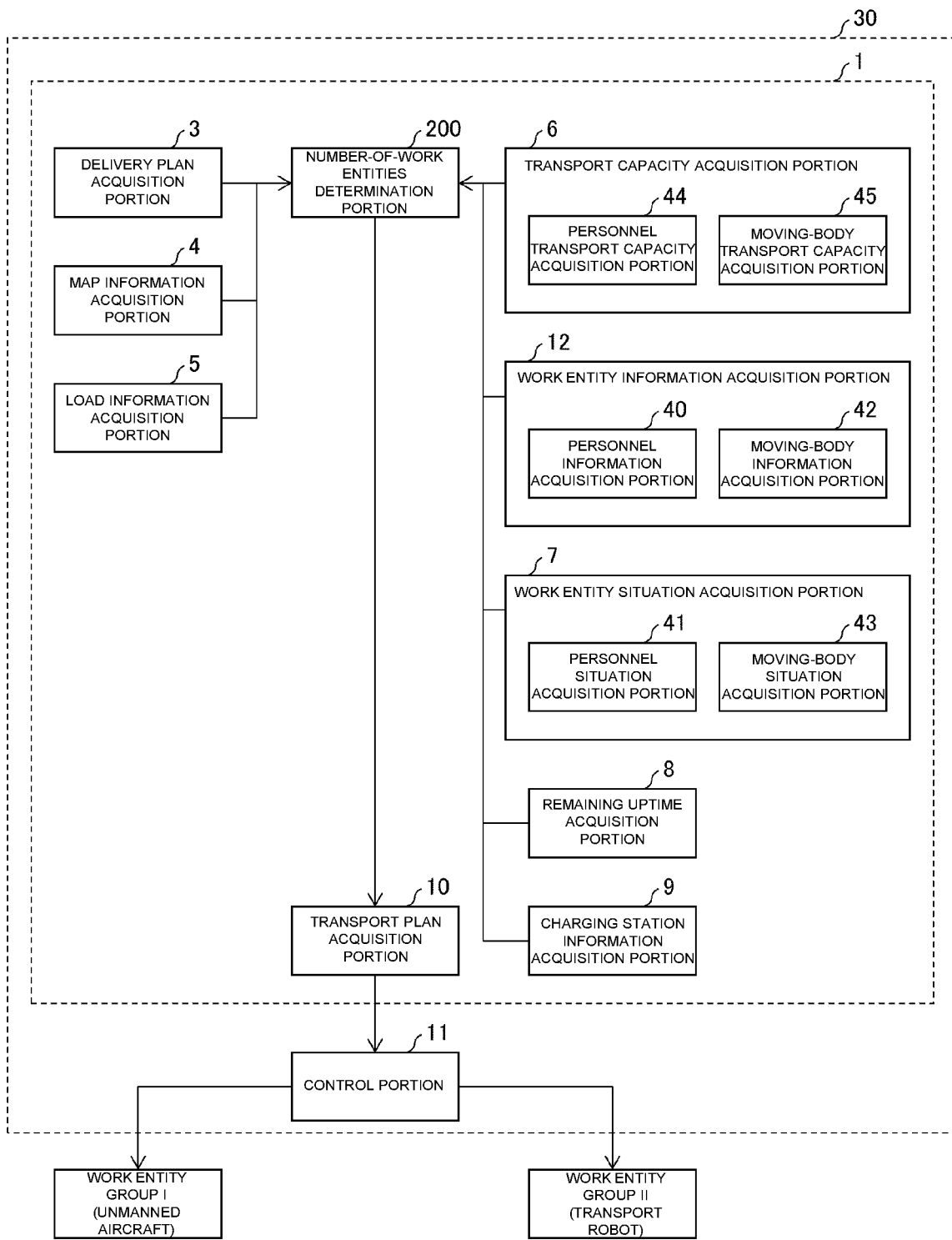
FIG. 1 is a block diagram illustrating an overall configuration of a simulator according to a first embodiment of the disclosure.

Hereinafter, embodiments of the disclosure will be described in detail with reference to the drawings. Here, configurations described in the embodiments do not limit the scope of the disclosure unless otherwise stated, and are merely simple description examples. To facilitate the description, the same reference numerals are given to members that have the same functions as those of members according to each embodiment and description thereof will be appropriately omitted.

In the present specification, the concept of "work entities" includes moving bodies such as robots, people (workers), and the like. The concept of "work entities" differs from that of "users" using a simulator or the like. "Moving bodies" is assumed not to include people.

In embodiments to be described below, work entities include both moving bodies and people, but the embodiments are not limited thereto and a mode in which work entities are only moving bodies or only people is also within the scope of the present specification.

First Embodiment (Configurations of Simulator 1 and Control Device 30)

Configurations of the simulator 1 and the control device 30 will be described with reference to FIG. 1. FIG. 1 is a block diagram illustrating the configurations of the simulator 1 and the control device 30. As illustrated in FIG. 1, the simulator 1 includes a number-of-work entities determination portion 200, a delivery plan acquisition portion 3, a map information acquisition portion 4, a load information acquisition portion 5, a transport capacity acquisition portion 6, a work entity information acquisition portion 12, a work entity situation acquisition portion 7, a remaining uptime acquisition portion 8, a charging station information acquisition portion 9, and a transport plan acquisition portion 10. The control device 30 includes the simulator 1 and a control portion 11.

The transport capacity acquisition portion 6 includes a personnel transport capacity acquisition portion 44 that acquires a transport capacity of people (personnel transport capacity) and a moving-body transport capacity acquisition portion 45 that acquires a transport capacity of moving bodies (moving-body transport capacity). The work entity information acquisition portion 12 includes a personnel information acquisition portion 40 that acquires information regarding people (personnel information) and a moving-body information acquisition portion 42 that acquires information regarding moving bodies (moving body information). The work entity situation acquisition portion 7 includes a personnel situation acquisition portion 41 that acquires a situation of people (personnel situation) and a moving-body situation acquisition portion 43 that acquires a situation of moving bodies (moving body situation).

In the embodiment, for example, the delivery plan acquisition portion 3 acquires a delivery plan related to transport of loads in a warehouse and supplies the delivery plan to the number-of-work entities determination portion 200. In the embodiment, the "delivery plan" also includes a plan decided in advance in relation to transport of loads in a warehouse. Here, the plan decided in advance in relation to transport of loads includes a plan related to a transport amount of loads and delivery times. For example, the plan related to transport of loads in the warehouse includes a plan regarding a time by which a certain load is transported.

In the embodiment, the map information acquisition portion 4 acquires map information in the warehouse and supplies the map information to the number-of-work entities determination portion 200. The map information is not limited to map information regarding one warehouse and can be, for example, map information regarding a plurality of warehouses installed at a site. In this way, an embodiment in which a work entity transports a load by reciprocating between a plurality of warehouses at a site is included in the embodiments disclosed in the present specification.

The load information acquisition portion 5 acquires load information regarding each load which is a transport target. The load information is a condition of a load necessary to determine a work entity transporting each load. Load information regarding transport of a load includes, for example, the weight, size, and shape of each load, a property of a load such as a center of gravity of the load, the number of loads, the position of each load in a warehouse, and information regarding a transport destination of each load in a warehouse. The load information acquisition portion 5 can acquire, for example, not only a 2-dimensional position of each load in a warehouse but also a 3-dimensional disposition of each load in the warehouse, such as on what level of a shelf a load is located, as the position of each load in the warehouse.

The load information acquisition portion 5 may acquire not only the number of loads decided to be actually transported but also an average number of loads per year or month in a certain warehouse as the number of loads. The load information acquisition portion 5 may determine the number of loads in a certain season with reference to data regarding a seasonal variation in the number of loads in a certain warehouse.

The transport capacity acquisition portion 6 acquires information which indicates a transport capacity of a work entity and is information including a condition of a load which can be transported by each work entity and supplies the information indicating the transport capacity to the number-of-work entities determination portion 200.

The transport capacity acquisition portion 6 acquires a condition of a load which can be transported by a work entity for each kind of work entity. In the embodiment, the "kind" of work entity indicates that a certain capability related to transport is different among capabilities of the work entity. For example, a plurality of kinds of work entities can be work entities of which maximum weights of loads which can be transported are different. In addition, the kind of work entity can be information referred to when the number-of-work entities determination portion 200 determines a kind of load to be transported.

The transport capacity acquisition portion 6 may be configured to acquire, for example, information such as a movement speed of each kind of work entity, power consumption, and a longest distance the work entity can move without being charged in addition to the weight of the load which can be transported by each kind of work entity, as the information indicating the transport capacity. In a mode in which each work entity can simultaneously transport a plurality of loads, the transport capacity acquisition portion 6 may acquire information regarding loads which can be simultaneously transported by each work entity.

The transport capacity acquisition portion 6 preferably acquires information including an item corresponding to an item included in the above-described load information as the information indicating the transport capacity of the work entity. For example, when the load information acquisition portion 5 acquires information regarding the weight or shape of a load as the load information, the transport capacity acquisition portion 6 preferably acquires the information regarding the weight or shape of the load which can be transported by the work entity as the information indicating the transport capacity of the work entity.

In the embodiment, work entities include people (workers). Specific work content is not particularly limited as long as "people" in the embodiment are people involved in transport work. The simulator 1 can calculate investment expenses more accurately in addition to expenses of people (labor expenses) by performing a simulation in consideration of people. Since the simulator 1 can simulate the necessary number of people and capacities of people in accordance with the delivery plan, a user can know a condition of appropriate employment targets and the number of employees.

In the embodiment, as will be described below, the work entities can include flight bodies such as unmanned aircrafts. In general, in an aircraft such as an unmanned aircraft, it is more difficult to impose a restriction on weight of a load which can be transported than it is with an automatic transport robot. Therefore, when a work entity includes a flight body such as an unmanned aircraft, it is particularly important for the foregoing load information acquisition portion 5 to acquire information regarding weight of a load and it is important for the transport capacity acquisition portion 6 to acquire weight of a load which can be transported by the work entity.

In the embodiment, the transport capacity acquisition portion 6 includes the personnel transport capacity acquisition portion 44 and the moving-body transport capacity acquisition portion 45. The personnel transport capacity acquisition portion 44 acquires a personnel transport capacity and the moving-body transport capacity acquisition portion 45 acquires a moving-body transport capacity.

The kinds of work entities and the transport capacities have been described above. A case in which the work entities are people will be described additionally. As a method of sorting people for each "kind," for example, a method of grouping people for each transport capacity and setting each group as a "person attribute" is exemplified.

A method of quantifying transport capacities of people is not particularly limited. For example, a maximum weight of a load which can be transported by people can be set as a transport capacity of people. When the transport capacity acquisition portion 6 acquires, for example, the maximum weight of a load which can be transported by people, as the transport capacity of people, the transportable maximum weight of a load can be, for example, a transportable maximum weight of a load at a time at which people are most tired in a day.

The work entity information acquisition portion 12 acquires work entity information including a maximum introduction number of work entities. The maximum introduction number of work entities indicates a maximum introduction number of work entities in a warehouse in the embodiment. A method of calculating the maximum introduction number of work entities is not particularly limited. For example, the work entity information acquisition portion 12 can calculate the maximum introduction number of work entities by setting a maximum number of work entities which can be introduced in another warehouse (a maximum introduction achievement number) as a standard. In an example, the work entity information acquisition portion 12 can set the maximum introduction achievement number+10 as the maximum introduction number.

The work entity information can further include an expense of each work entity. By causing the work entity information to include the expense of each work entity, the simulator 1 can simulate capital investment expenses. Since the simulator 1 can simulate the capital investment expenses, a user can estimate necessary capital investment for a customer who performs new installation, extension, or the like of a warehouse or the like and can submit a proposal.

In the present embodiment, the work entity information acquisition portion 12 includes the moving-body information acquisition portion 42 and the personnel information acquisition portion 40. The moving-body information acquisition portion 42 acquires moving body information and the personnel information acquisition portion 40 acquires personnel information. The moving body information and the personnel information correspond to the above-described work entity information. For example, an expense of a moving body can be a portion price of the moving body or the like and an expense of a person can be an hourly wage or the like of the person.

The work entity situation acquisition portion 7 acquires a work entity situation at a certain time point including positional information at a time point of each work entity and supplies the work entity situation to the number-of-work entities determination portion 200. The "positional information" in a warehouse of each work entity may be a position at which each work entity is assumed to be currently located at a certain time point based on a result during the simulation.

In the embodiment, the work entity situation acquisition portion 7 includes the personnel situation acquisition portion 41 that acquires a personnel situation and the moving-body situation acquisition portion 43 that acquires a moving body situation.

Although not illustrated in FIG. 1, the work entity situation acquisition portion 7 may acquire a virtual position of a work entity at a certain time point with reference to a part of a transport pattern calculated by the number-of-work entities determination portion 200.

The positional information of the work entity can be not only 2-dimensional positional information in a warehouse but also 3-dimensional positional information including information regarding a height at which the work entity is located. For example, when a work entity includes a flight body such as an unmanned aircraft and the unmanned aircraft or the like is assumed to be flying in a warehouse, the work entity situation acquisition portion 7 can be configured to acquire positional information including a height at which the unmanned aircraft or the like is flying. When the unmanned aircraft or the like is assumed to wait on a shelf or the like, the work entity situation acquisition portion 7 acquires a waiting position of the unmanned aircraft or the like as virtual positional information.

The work entity situation acquisition portion 7 can also acquire information regarding use or non-use of each work entity at a certain time point and a time at which each work entity can be used (usable time) in addition to the positional information of each work entity. By acquiring such information, the number-of-work entities determination portion 200 can generate a more efficient transport plan. The use or non-use of each work entity at a certain time point is determined in accordance with, for example, whether the work entity transports a load at the certain time point, whether the work entity is being charged or is taking a break at the certain time point, or whether the work entity is broken at the certain time point. Whether a person is on a break can be determined in accordance with whether the person is away from a work area or the like.

The time at which each work entity can be used can be, for example, a time at which transport of a load by the work entity ends or a time at which charging of the work entity finishes in a mode in which the work entity is a moving body. The time at which each work entity can be used, for example, a time at which a person finishes a break in a form in which the work entity is a person. For example, when a break time such as a lunch break is decided in the mode in which the work entity is a person, a time at which the break time ends can be a time at which each work entity can be used.

The remaining uptime acquisition portion 8 acquires a remaining uptime of each moving body necessary for charging and supplies the remaining uptime to the number-of-work entities determination portion 200. When the remaining uptime acquisition portion 8 acquires the remaining uptime of each moving body, the number-of-work entities determination portion 200 can generate a charging plan of the moving body. Since the number-of-work entities determination portion 200 can generate an efficient charging plan of the moving body, a device in which frequent charging is necessary, such as an unmanned aircraft, can be utilized more appropriately as a moving body.

The charging station information acquisition portion 9 acquires charging station information regarding whether to charge the moving body at a certain time point and supplies the charging station information to the number-of-work entities determination portion 200. The charging station information includes, for example, information regarding the number of chargers which are unoccupied at a certain time point, the number of moving bodies which can be charged at a certain time point, and a power capacity which can be supplied by each charging station. The charging station information may include information indicating the position of the charging station. Since the charging station information acquisition portion 9 acquires the charging station information, the number-of-work entities determination portion 200 can generate a more efficient charging plan.

When the work entities are people, charging is not necessary, of course. However, the simulator 1 can perform simulation in consideration of break times of people instead.

The number-of-work entities determination portion 200 determines a work entity that transports each load with reference to the delivery plan acquired by the delivery plan acquisition portion 3, the map information acquired by the map information acquisition portion 4, the load information acquired by the load information acquisition portion 5, the transport capacity of each work entity acquired by the transport capacity acquisition portion 6, the work entity information acquired by the work entity information acquisition portion 12, the work entity situation acquired by the work entity situation acquisition portion 7, the remaining uptime of each work entity acquired by the remaining uptime acquisition portion 8, and the charging station information acquired by the charging station information acquisition portion 9. The number-of-work entities determination portion 200 generates a transport plan with reference to a determination result regarding a load transported by each work entity (in the present specification, also referred to as a "determination result" regarding the work entity). The number-of-work entities determination portion 200 supplies the generated transport plan to the transport plan acquisition portion 10. The configuration of the number-of-work entities determination portion 200 and the details of generation of the transport plan will be described below with reference to FIG. 2.

The transport plan acquisition portion 10 acquires the transport plan from the number-of-work entities determination portion 200. The transport plan acquisition portion 10 supplies the transport plan to the control portion 11. In the embodiment, the control portion 11 controls, for example, two kinds of work entity groups with different transport capacities. Work entity group I includes a plurality of unmanned aircrafts (drones) and work entity group II includes a plurality of automatic transport robots. In the embodiment, the work entity group is a group in which the same kinds of work entities are collected. The number of work entity groups and the number of work entities in each work entity group are not particularly limited. Although not illustrated in FIG. 1, the control portion 11 can also supply information including work instructions to people.

In the embodiment, when work entity group I includes unmanned aircrafts, the number-of-work entities determination portion 200 can generate a more efficient transport plan. In general, an unmanned aircraft can move at a faster speed than an automatic transport robot and can transport a load along diverse transport routes without being obstructed by obstacles on the ground compared to an automatic transport robot. An unmanned aircraft is suitable for transporting a load located on a high shelf. Further, an unmanned aircraft can easily be disposed so that movement of a transport robot moving on the ground is not disturbed. In this way, in the present embodiment, since the control portion 11 controls a work entity including an unmanned aircraft, the number-of-work entities determination portion 200 can generate a more efficient transport plan.

Since the work entities include a plurality of kinds of work entities with different transport capacities, the number-of-work entities determination portion 200 can determine a load transmitted by each work entity in accordance with the transport capacity of each kind of work entity and can generate a more efficient transport plan.

(Number-of-Work Entities Determination Portion 200)

Figure 2:
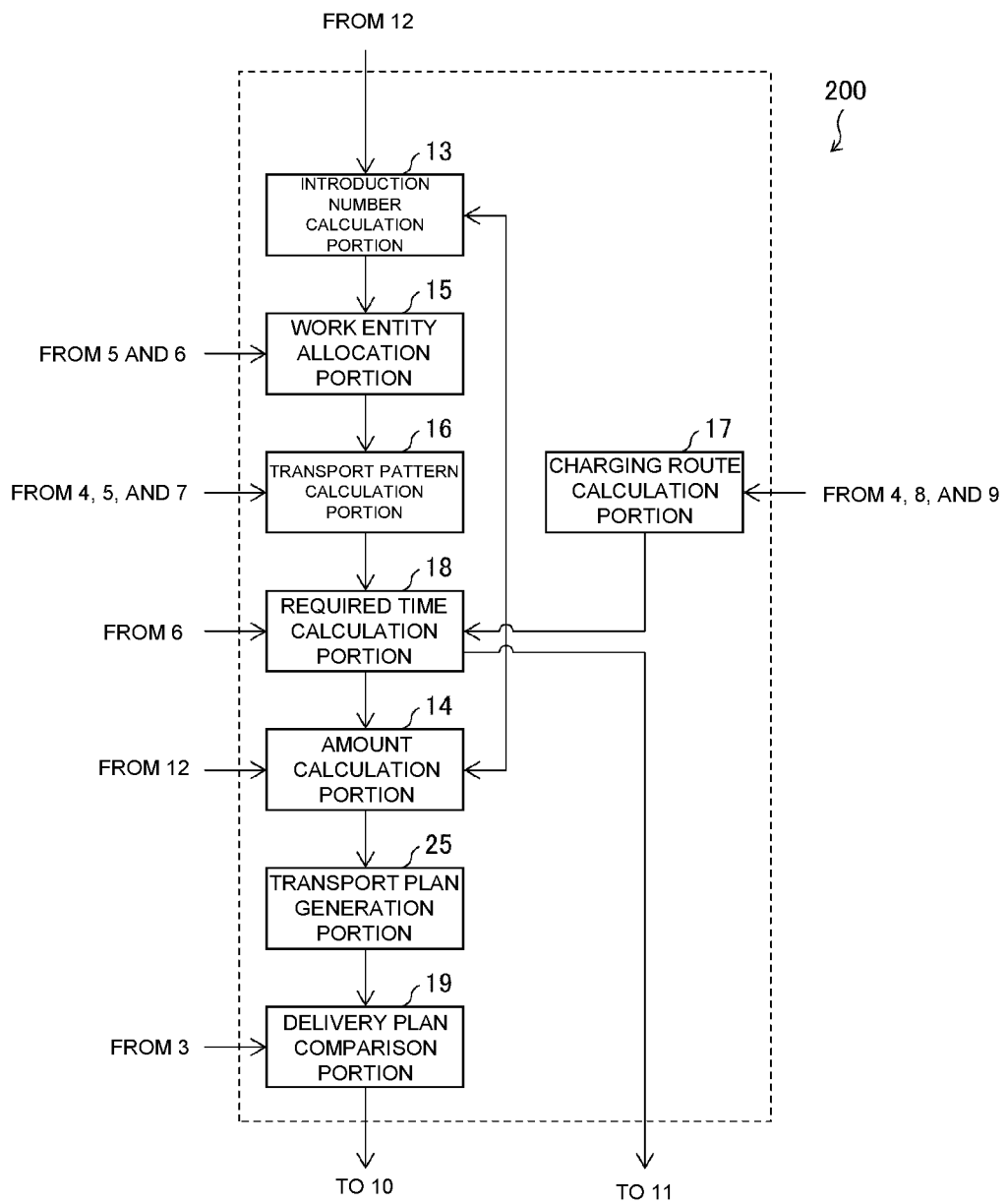
FIG. 2 is a block diagram illustrating an overall configuration of a number-of-work entities determination portion according to the first embodiment of the disclosure.

A configuration of the number-of-work entities determination portion 200 will be described with reference to FIG. 2. FIG. 2 is a block diagram illustrating an overall configuration of the number-of-work entities determination portion 200. The number-of-work entities determination portion 200 includes an introduction number calculation portion 13, a work entity allocation portion 15, a transport pattern calculation portion 16, a charging route calculation portion 17, a required time calculation portion 18, a transport plan generation portion 25, an amount calculation portion 14, and a delivery plan comparison portion 19.

First, the introduction number calculation portion 13 calculates an introduction number pattern with reference to the maximum introduction number of work entities supplied from the work entity information acquisition portion 12. Here, the introduction number pattern is a possible combination with regard to each introduction number of work entities. The details of the method of calculating the introduction number pattern will be described later. As an example of the process of determining the introduction number, the introduction number calculation portion 13 supplies one of the calculated introduction number patterns to the work entity allocation portion 15.

The work entity allocation portion 15 refers to the load information supplied from the load information acquisition portion 5, the transport capacity supplied from the transport capacity acquisition portion 6, and the introduction number pattern supplied from the introduction number calculation portion 13. The work entity allocation portion 15 allocates all the work entities that have the transport capacities capable of transporting loads to the loads in each introduction number pattern based on the reference information. The work entity allocation portion 15 determines whether there are loads to which the work entities may not be allocated. When there are loads to which the work entities may not be allocated, an error is supplied to a display portion (not illustrated) of the control device 30 and the display portion displays the error. When the work entities can be allocated to all the loads, the work entity allocation portion 15 supplies an allocation result to the transport pattern calculation portion 16.

The transport pattern calculation portion 16 refers to the map information supplied from the map information acquisition portion 4, the work entity situation supplied from the work entity situation acquisition portion 7, and the allocation result in each introduction number pattern supplied from the work entity allocation portion 15. Based on the reference information, the transport pattern calculation portion 16 calculates a plurality of patterns which is combinations of the loads and the work entities transporting the loads as transport patterns with regard to each introduction number pattern. The details of a method of calculating the transport patterns will be described later. The transport pattern calculation portion 16 calculates a transport route for each transport pattern with reference to a current position of the work entity supplied from the work entity situation acquisition portion 7, a current position of a load supplied from the load information acquisition portion 5, and a transport destination of the load. The transport pattern calculation portion 16 supplies the calculated transport patterns and transport route to the required time calculation portion 18 and the charging route calculation portion 17.

The charging route calculation portion 17 determines whether it is necessary to charge each moving body with reference to the remaining uptime supplied from the remaining uptime acquisition portion 8. A method in which the charging route calculation portion 17 determines whether it is necessary to charge each moving body is not particularly limited. For example, when the remaining uptime of a certain moving body is equal to or less than a constant value, the charging route calculation portion 17 determines that it is necessary to charge the moving body. A user can appropriately set the "constant value." The charging route calculation portion 17 may determine the constant value in consideration of the remaining uptime necessary to move the work entity to the position of an unoccupied charging station.

When it is necessary to charge the moving body, the charging route calculation portion 17 calculates a route along which each moving body is moved to the charging station, that is, a charging route, for each moving body with reference to the map information supplied from the map information acquisition portion 4. The charging route calculation portion 17 supplies the calculated charging route to the required time calculation portion 18.

For example, the charging route calculation portion 17 calculates a plurality of charging routes. The required time calculation portion 18 can perform more efficient charging by determining a charging route in which a required time for charging is the shortest with reference to the plurality of charging routes supplied from the charging route calculation portion 17 and supplying the charging route to the control portion 11. Although not illustrated in FIG. 2, the charging route calculation portion 17 may calculate only one charging route and supply the charging route to the control portion 11 without supplying the charging route to the required time calculation portion 18.

The required time calculation portion 18 refers to the transport patterns supplied from the transport pattern calculation portion 16, the transport route in each transport pattern, and a movement speed of each work entity supplied from the transport capacity acquisition portion 6. Based on the reference information, the required time calculation portion 18 determines a transport pattern in which the required time taken to transport a load is the shortest and a required time in the transport pattern with regard to each introduction number pattern. The details of a method of determining the transport pattern in which the required time is the shortest with regard to each introduction number pattern will be described later.

The required time calculation portion 18 the required times of the transport patterns determined with regard to each introduction number pattern and determines one transport pattern or a plurality of transport patterns in which the required time is the shortest. The transport patterns in which the required time determined by the required time calculation portion 18 is the shortest are referred to as a transport pattern group below. The transport pattern group in which the determined required time is the shortest time is supplied to the amount calculation portion 14.

The required time calculation portion 18 may calculate a required time in which the transport pattern and the charging pattern are combined and calculate a combination in which a sum of the required times of the transport pattern and the charging pattern is the shortest. Thus, the transport plan generation portion 25 can generate the more efficient transport plan and charging plan.

The amount calculation portion 14 calculates a total amount spent for the work entities used in each transport pattern with reference to the transport pattern group in which the required time supplied from the required time calculation portion 18 is the shortest and an expense of each work entity supplied from the work entity information acquisition portion 12. As will be described later in detail, the amount calculation portion 14 supplies the introduction number calculation portion 13 with information indicating that calculation of the total amount of a certain introduction number pattern is completed whenever the calculation of the total amount of the certain introduction number pattern is completed. The introduction number calculation portion 13 receiving the information determines whether the calculation of the transport pattern in which the required time is the shortest and the calculation of the total amount are completed with regard to all the introduction number patterns. When the introduction number calculation portion 13 determines that the calculation of the transport pattern in which the required time is the shortest and the calculation of the total amount are completed with regard to all the introduction number patterns, information indicating that the calculation is completed with regard to all the introduction number patterns is supplied to the amount calculation portion 14. Thus, the number-of-work entities determination portion 200 can generate a transport plan in consideration of all the introduction number patterns.

The amount calculation portion 14 determines a transport pattern in which the total amount spent for the work entities is the smallest in the transport pattern group in which the required time is the shortest. In this configuration, the amount calculation portion 14 can determine the transport pattern in which the required time is the shortest and the total amount spent for the work entities is small. The amount calculation portion 14 supplies the transport pattern in which the required time is the shortest and the total amount spent for the work entities is small to the transport plan generation portion 25.

The transport plan generation portion 25 generates the transport plan with reference to the transport pattern supplied by the amount calculation portion 14 in which the required time is the shortest and the total amount spent for the work entities is small and which is. The transport plan generation portion 25 supplies the calculated transport plan to the delivery plan comparison portion 19.

The delivery plan comparison portion 19 compares the transport plan supplied from the transport plan generation portion 25 with the delivery plan supplied from the delivery plan acquisition portion 3 and determines whether the transport plan is able to attain the delivery plan. When the delivery plan comparison portion 19 determines that the transport plan is able to attain the delivery plan, the transport plan is supplied to the transport plan acquisition portion 10. Conversely, when the delivery plan comparison portion 19 determines that the transport plan is not able to attain the delivery plan, an error is supplied to the display portion of the control device 30 and the display portion displays the error.

The transport plan generation portion 25 may acquire the charging route from the charging route calculation portion 17 and generate the transport plan in consideration of a time at which charging of each moving body is completed. Thus, the transport plan generation portion 25 can generate the more efficient transport plan and charging plan.

In the embodiment, the number-of-work entities determination portion 200 determines the number of work entities so that the required time related to load transport is the shortest and the total amount spent for the work entities is small, but a user can freely set an optimum number of work entities under a certain condition when the user determines the number of work entities. For example, the user can perform setting so that the number-of-work entities determination portion 200 determines the number of work entities under a predetermined condition, in other words, a condition that a certain item is within the range of a condition set by the user. Here, the predetermined condition is not particularly limited and can be, for example, a condition of energy consumption or the like in addition to the above-described required time and the total amount spent for the work entities.

(Overview 1 of Transport Pattern Calculation)

Overview 1 of transport pattern calculation will be described with reference to FIGS. 3a and 3b. FIG. 3a is a diagram illustrating the load information, the transport capacity of each moving body, the moving body information, and the moving body situation in an example of the transport pattern calculation. FIG. 3b is a diagram illustrating an example of a method of calculating introduction number patterns.

The introduction number calculation portion 13 refers to the load information supplied from the load information acquisition portion 5 with regard to loads A to C which are transport targets, as shown in Table 33. In this example, the load information includes the weight of each load, a start position of transport, and a goal position of the transport.

The introduction number calculation portion 13 refers to the transport capacity supplied from the transport capacity acquisition portion 6, the amount supplied from the work entity information acquisition portion 12, and the work entity situation supplied from the work entity situation acquisition portion 7 with regard to work entities 1 to 3, as shown in Table 34. In this example, the transport capacity includes the weight of a transportable load of each work entity, the work entity information includes an amount spent for each work entity, and the work entity situation includes an initial position of each work entity. In this example, the work entity is at an initial position which is a position before the load is transported, but the position of each work entity is not particularly limited. For example, the work entity situation acquisition portion 7 may acquire a virtual position of each work entity after the load is transported to some extent.

The introduction number calculation portion 13 refers to the maximum introduction number of kinds of work entities supplied from the work entity information acquisition portion 12. In the embodiment, the maximum introduction numbers of work entities 1, 2, and 3 are x, y, and z, respectively. The introduction number calculation portion 13 calculates all the possible combinations of the introduction numbers of work entities 1 to 3 setting the maximum introduction number of each work entity as an upper limit and sets each combination as an introduction number pattern. The introduction number calculation portion 13 supplies the calculated introduction number patterns to the work entity allocation portion 15. The work entity allocation portion 15 allocates the work entities to the loads in each introduction number pattern and supplies an allocation result of the work entities to the transport pattern calculation portion 16. The transport pattern calculation portion 16 calculates transport patterns and transport routes with reference to the allocation result of the work entities and supplies the transport patterns and the transport routes to the required time calculation portion 18. The details of the allocation of the work entities and the calculation of the transport pattern will be described later.

The required time calculation portion 18 selects the transport pattern in which the required time is the shortest as the transport pattern of the introduction number pattern in the transport routes calculated with regard to one introduction number pattern and sets the required time of the transport pattern as a required time of the introduction number pattern. The required time calculation portion 18 selects the transport pattern in which the required time is the shortest with regard to all the introduction number patterns and determines the required time of each introduction number pattern. The required time determined for each introduction number pattern is shown in the table of FIG. 3b. The determined transport pattern includes a determination result of each work entity.

The required time calculation portion 18 compares the required times of the transport pattern determined for each introduction number pattern and sets one transport pattern or the plurality of transport patterns in which the required time is the shortest as a transport pattern group G in which the required time is the shortest. In this example, since the required time is the shortest in introduction number patterns 5 to X, the transport patterns determined in introduction number patterns 5 to X are collected and set as the transport pattern group G in which the required time is the shortest.

The amount calculation portion 14 calculates a total amount spent for the used work entities in each introduction number pattern. In this example, the amount calculation portion 14 calculates the total amount for all the introduction number patterns, but the embodiment is not limited thereto. For example, the amount calculation portion 14 may calculate the total amount only for the transport pattern group G in which the required time is the shortest.

In the embodiment, the amount calculation portion 14 selects the transport pattern in which the total amount spent for the work entities is the smallest in the transport pattern group in which the required time is the shortest and supplies the transport pattern to the transport plan generation portion 25.

In this example, the simulator 1 calculates the transport patterns considering, as the work entities, not only the moving bodies but also people involved in transport work as the work entities. In this example, to facilitate the description, like moving bodies, people are assumed to transport loads, but workers may be in charge of, for example, only work different from that performed by the moving bodies, such as work of transferring loads to the moving bodies. As shown in Table 35, people are grouped for each transport capacity and "person attributes" (persons 1 to 3) corresponding to each group are given.

The introduction number calculation portion 13 refers to each kind of moving body and the maximum introduction number of people with person attributes supplied from the work entity information acquisition portion 12. In the embodiment, the maximum introduction numbers of moving bodies 1, 2, and 3 and persons 1, 2, and 3 are, x, y, and z and a, b, and c, respectively. The introduction number calculation portion 13 calculates all the possible combinations of work entities 1 to 3 and persons 1 to 3 setting the maximum introduction number of each work entity as an upper limit and sets each combination as an introduction number pattern. The introduction number calculation portion 13 supplies the calculated introduction number patterns to the work entity allocation portion 15.

Thereafter, as in overview 1 of the transport pattern calculation described above, a transport pattern group in which the required time is the shortest is determined through processes of the work entity allocation portion 15, the transport pattern calculation portion 16, and the required time calculation portion 18. The amount calculation portion 14 selects a transport pattern in which the total amount spent for the work entity is the smallest from the transport pattern group in which the required time is the shortest, as in overview 1 of the transport pattern calculation described above.

In this example, the simulator 1 can determine the number of moving bodies and the number of people with person attributes satisfying a predetermined condition. Although not illustrated, the simulator 1 may first determine the number of workers and person attributes and then may calculate the number of appropriate work entities. In contrast to this, the simulator 1 may first determine the number of suitable work entities and then may calculate the necessary number of workers and capacities of the workers.

(Transport Pattern Calculation Example 1)

Transport pattern calculation example 1 in each introduction number pattern will be described with reference to FIGS. 4a and 4b.

Figures 4A, 4B:
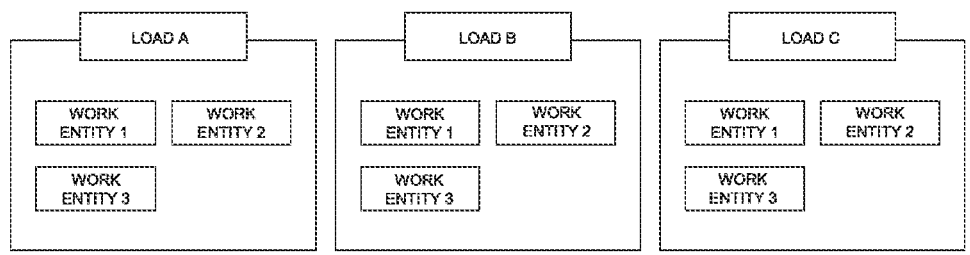
FIGS. 4a and 4b are diagrams illustrating a second overview of the transport pattern calculation example according to the first embodiment of the disclosure.

After FIGS. 4a and 4b, the load information of each load and the transport capacity of the work entity are different from the values described in FIG. 3a. To facilitate the description, in FIGS. 4a to 10, the work entities are assumed not to include people.

FIG. 4a is a diagram illustrating a method of allocating the work entity to each load. FIG. 4b is a table illustrating a required time in each transport pattern.

As illustrated in FIG. 4a, the work entity allocation portion 15 first allocates all the work entities capable of transporting each load with reference to the load information regarding each load and the transport capacity of each work entity. In this example, work entities 1 to 3 are all allocated to each of loads A to C. The work entity allocation portion 15 supplies a calculated allocation result to the transport pattern calculation portion 16.

As illustrated in FIG. 4b, subsequently, the transport pattern calculation portion 16 calculates combinations of the loads and the work entities as a plurality of patterns. The transport pattern calculation portion 16 calculates a transport route for each combination and sets a combination of the work entity and the transport route for each load as a transport pattern. The transport pattern calculation portion 16 supplies the calculated transport pattern to the required time calculation portion 18. The required time calculation portion 18 selects the transport pattern in which the required time is the shortest among the plurality of transport patterns. In this example, the required time calculation portion 18 selects transport pattern 3 in which the required time is the shortest as the transport pattern.

In this example, the required time calculation portion 18 examines the required time exhaustively on all the transport patterns indicating each combination of each load and the work entities. However, when the number of transport patterns is large, the required time calculation portion 18 may appropriately narrow down the transport pattern and calculate the required time.

(Transport Pattern Calculation Example 2)

Transport pattern calculation example 2 in each introduction number pattern will be described with reference to FIGS. 5a, 5b, 6a and 6b.

Figures 5A, 5B:
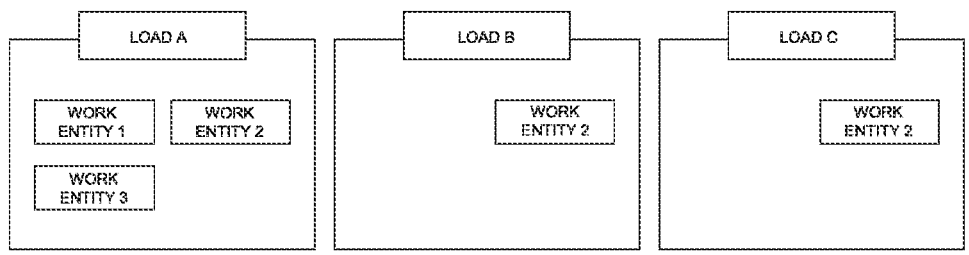
FIGS. 5a and 5b are diagrams illustrating a second transport pattern calculation example according to the first embodiment of the disclosure.

FIG. 5a is a diagram illustrating a method of allocating the work entity to each load. FIG. 5b is a table illustrating a required time in each transport pattern. FIG. 6a is a diagram illustrating load information regarding each load and charging station information. FIG. 6b is a diagram illustrating a work entity situation of each work entity at the time of starting of first transport.

As illustrated in FIG. 5a, in this example, unlike example 1 described above, work entities 1 to 3 are allocated as work entities capable of transporting load A, only work entity 2 is allocated as a work entity capable of transporting load B, and only work entity 2 is allocated as a work entity capable of transporting load C.

As shown in Table 20 of FIG. 5b, in this example, unlike example 1 described above, the work entity allocation portion 15 may not transport all the loads by merely allocating each work entity to each load once. Accordingly, in this example, after the work entity allocation portion 15 allocates the work entities once, as will be described later, the work entities are allocated again with reference to an ending time and a position of the first transport of each work entity.

Table 21 of FIG. 5b shows transport patterns which are calculated by the work entity allocation portion 15 and include twice allocation results of the work entities. Table 20 shows first allocation. The transport pattern calculation portion 16 allocates the work entities in Table 20 to unallocated loads second time to obtain transport patterns shown in Table 21.

The number of times the transport pattern calculation portion 16 allocates the work entities is not particularly limited. The transport pattern calculation portion 16 can allocate the work entities until loads to which the work entities are allocated do not exist and can calculate the transport patterns including allocation results of a plurality of times.

For transport patterns 1, 2, 4, and 5 in Table 20, the transport patterns obtained by the work entity allocation portion 15 allocating the work entities second time are transport patterns 1, 2, 5, and 6. For transport pattern 3 in Table 20, transport patterns obtained by the work entity allocation portion 15 allocating the work entities second and third times are transport patterns 3 and 4. In transport pattern 3, work entity 2 first transports load A, subsequently transports load B, and then transports load C. In transport pattern 4, work entity 2 first transports load A, subsequently transports load C, and then transports load B.

In the transport patterns shown in Table 21, each work entity first transports the load in the allocation of Table 20 and subsequently transports the load allocated in Table 21. In Table 21, (F) means a load which the work entity first transports and (S) means a load which the work entity subsequently transports.

The required time calculation portion 18 calculates a required time of each transport pattern and selects transport pattern 1 in which the required time is the shortest.

Calculation of the transport route of second transport in transport pattern 1 will be described in detail with reference to FIGS. 6a and 6b. As described above with reference to Table 20 of FIG. 5b, load C may not be transported only in the first allocation. Accordingly, the work entity allocation portion 15 determines the work entities which transports load C by performing the second allocation. As illustrated in FIGS. 4a and 4b, since only work entity 2 has the transport capacity capable of transporting load C, work entity 2 can be allocated to load C in the second allocation.

Start positions and goal positions of loads A to C are each shown in Table 31 of FIG. 6a. The positions of the charging stations A to C are shown in Table 32 of FIG. 6a.

The transport pattern calculation portion 16 calculates a transport route of the second transport with reference to the ending time and the position of the first transport. In the first transport, since work entity 2 transports load B, work entity 2 is located at a goal position PGB of load B at the time of ending of the first transport.

As illustrated in FIG. 6b, work entities 1 and 2 used for the first transport are unusable at the time of starting of the first transport. Work entity 2 can be used after 30 seconds from the starting of the first transport. In this example, although not used for the second transport, work entity 1 can be used in the ending of the first transport after 20 seconds from the starting of the first transport. Work entity 3 is located in charging station C without transporting a load. When the work entity is being charged in the charging station, a usable time of the work entity is a charging ending schedule time.

In this example, there is only one work entity which can perform the second transport. However, when there is a plurality of work entities which can perform the second transport, the transport pattern calculation portion 16 may calculate a transport route so that, for example, the work entity of which a usable time is the earliest is used.

The transport pattern calculation portion 16 calculates a shortest route along which work entity 2 moves to a goal position PGC of load C via a position Psc of load C from the position PGB of work entity 2 at the time of ending of the first transport and sets the shortest route as a transport route of the second transport.

(Transport Pattern Calculation Example 3)

Transport pattern calculation example 3 in each introduction number pattern will be described with reference to FIGS. 7a to 10. FIGS. 7a to 10 are diagrams illustrating calculation example 3 of all the transport patterns.

Figures 7A, 7B:
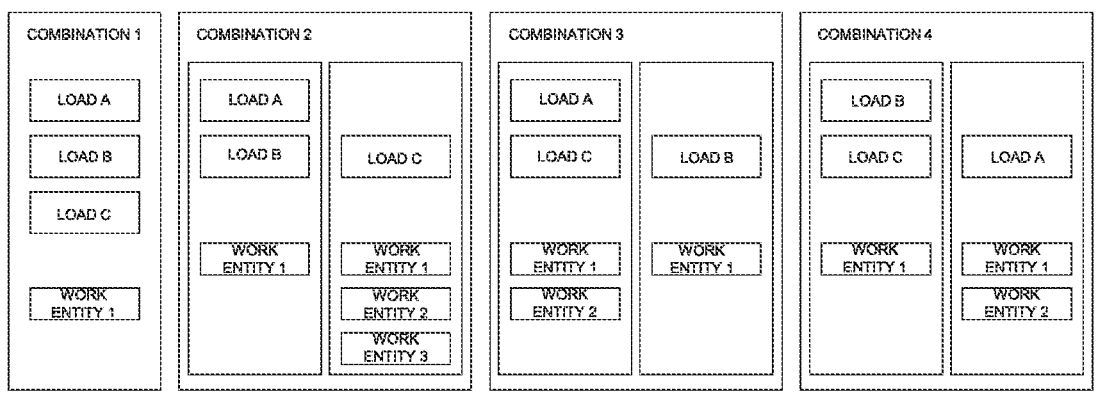
FIGS. 7a and 7b are diagrams illustrating a third transport pattern calculation example according to the first embodiment of the disclosure.

FIG. 7a is a table illustrating weights of loads A to C and weights of loads which can be transported by work entities 1 to 3 in this example.

As illustrated in FIG. 7b, in this example, unlike examples 1 and 2 described above, one work entity can collectively transport a plurality of loads. As illustrated in FIG. 7b, the work entity allocation portion 15 allocates all the work entities capable of performing transport to a single load or a plurality of loads with reference to information SI regarding loads which can be simultaneously transported by each work entity. For example, the work entity allocation portion 15 generates the information SI with reference to transportable weight of a target work entity and the weight of each load.

FIG. 8 illustrates transport patterns calculated by the transport pattern calculation portion 16 and the required times calculated by the required time calculation portion 18 based on combinations 1 to 4 obtained in FIG. 7b. The transport pattern calculation portion 16 calculates a plurality of transport patterns with regard to combinations 2 to 4. The required time calculation portion 18 calculates a required time of each transport pattern and selects transport pattern 3 in which the required time is the shortest.

Figure 10:
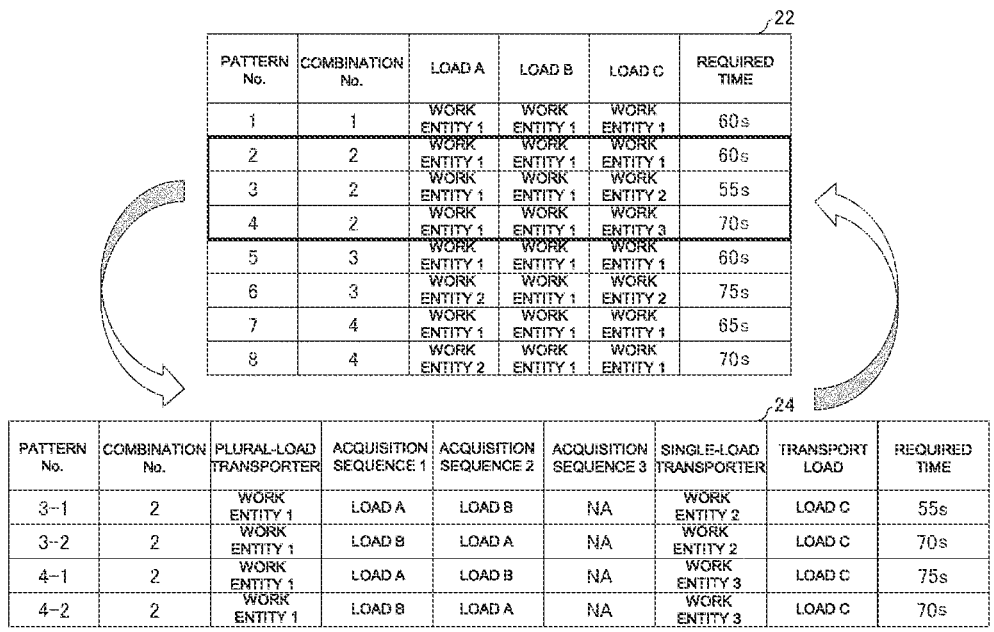
FIG. 10 is a diagram illustrating the third transport pattern calculation example according to the first embodiment of the disclosure.

A method of calculating transport patterns will be described in detail with reference to FIGS. 9 and 10. As illustrated in FIGS. 9 and 10, there is a plurality of kinds of work entities transporting a plurality of loads and a plurality of sequences in which the work entities acquires the loads with regard to combinations 1 to 4.

As illustrated in Table 23 of FIG. 9, the transport pattern calculation portion 16 calculates a feasible load acquisition pattern with regard to combination 1. In combination 1, a work entity is only a work entity that transports a plurality of loads (in the table, referred to as a plural-load transporter). In combination 1, there is no work entity that transports a single load (in the table, referred to as a single-load transporter). The required time calculation portion 18 calculates the required time in each transport pattern and selects transport pattern 1-1 in which the required time is the shortest as transport pattern 1 of combination 1.

As shown in Table 24 of FIG. 10, the transport pattern calculation portion 16 calculates a plurality of transport patterns of load acquisition in combination 2. Of the transport patterns, the same transport patterns as those of Table 23 of FIG. 9 are not described in Table 24. As illustrated in Table 24, in the transport pattern of combination 2, there are work entity 1 that transports a plurality of loads and work entities 2 and 3 that transport a single load.

The required time calculation portion 18 calculates a required time in each transport pattern and selects the transport pattern in which the required time is the shortest as the transport pattern of combination 2 for each combination of work entities to be used. In this example, the required time calculation portion 18 selects transport pattern 3-1 in which the required time is shorter as an transport pattern in the case of using of work entities 1 and 2 in combination 2 between patterns 3-1 and 3-2 which are transport patterns in which work entity 1 transports loads A and B and work entity 2 transports load C. Similarly, the required time calculation portion 18 selects transport pattern 4-2 in which the required time is shorter as an transport pattern in the case of using of work entities 1 and 3 in combination 2 between patterns 4-1 and 4-2 which are transport patterns in which work entity 1 transports loads A and B and work entity 3 transports load C. Transport pattern 2 of Table 22 is a transport pattern when work entity 1 transports all the loads in combination 2 and is the same as transport pattern 1-1 in combination 1 described above.

(Transport Pattern Calculation Example 4)

Next, transport pattern calculation example 4 will be described. This example corresponds to a calculation example in which transport pattern calculation examples 3 and 4 described above are combined.

In this example, as in transport pattern calculation example 3, all the work entities capable of transporting loads are allocated to a single load or a plurality of loads and transport patterns are calculated in consideration of a sequence in which a work entity transporting a plurality of loads acquires the loads. Further, as in transport pattern calculation example 2 described above, the work entity allocation portion 15 allocates the work entities once and subsequently allocates the work entities again with reference the ending time and the position of the first transport of each work entity.

(Flow of Process of Determining the Number of Work Entities)

Figure 11:
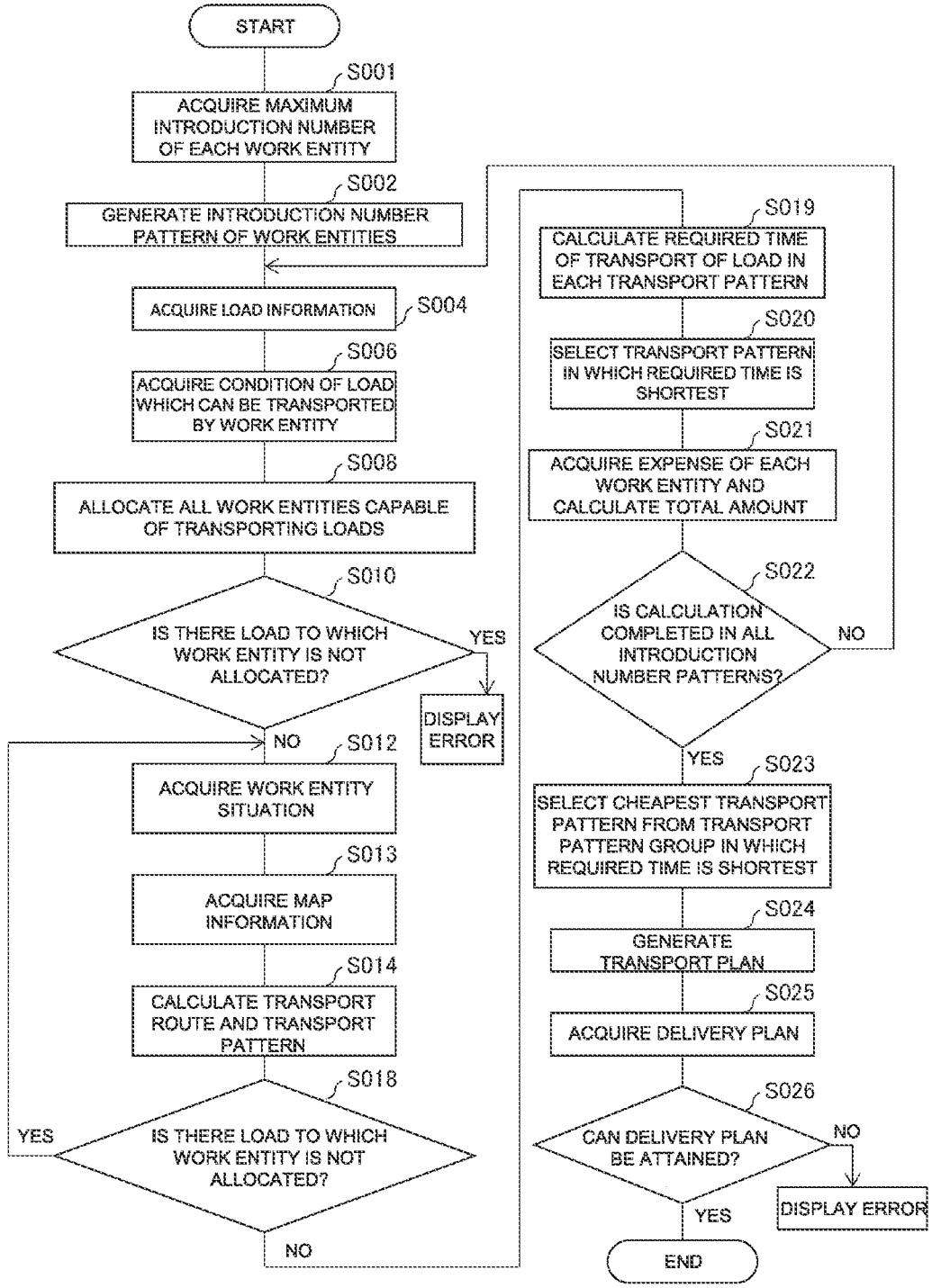
FIG. 11 is a sequence diagram illustrating a flow of a process of determining the number of work entities according to the first embodiment of the disclosure.

A flow of a process of determining the number of work entities transporting each load will be described with reference to FIG. 11. FIG. 11 is a flowchart illustrating the flow of the process of determining the number of work entities.

(Step S001)

In step S001, the introduction number calculation portion 13 first acquires work entity information including the maximum introduction number of each work entity.

(Step S002)

Subsequently, in step S002, the introduction number calculation portion 13 calculates the introduction number pattern with reference to the maximum introduction number of each work entity. The introduction number calculation portion 13 supplies the calculated introduction number pattern to the work entity allocation portion 15.

(Step S004)

Subsequently, in step S004, the load information acquisition portion 5 acquires the load information. The load information acquisition portion 5 supplies the acquired load information to the work entity allocation portion 15.

(Step S006)

Subsequently, in step S006, the transport capacity acquisition portion 6 acquires the transport capacity of the work entity including the condition of the load which can be transported by each work entity. The transport capacity acquisition portion 6 supplies the acquired transport capacity to the work entity allocation portion 15.

A sequence of the foregoing steps S002 to S006 is not particularly limited and can be transposed mutually.

(Step S008)

Subsequently, in step S008, the work entity allocation portion 15 allocates all the work entities capable of transporting each load to each load with regard to one introduction number pattern supplied from the introduction number calculation portion 13. A method of allocating the work entities has been described.

(Step S010)

Subsequently, in step S010, the work entity allocation portion 15 determines whether there is a load to which the work entities are not allocated. When there is a load to which the work entities are not allocated, the work entity allocation portion 15 supplies an error to the display portion (not illustrated) of the control device 30 and the display portion displays the error. When the work entities are allocated to all the loads, the work entity allocation portion 15 supplies an allocation result to the transport pattern calculation portion 16.

(Step S012)

Subsequently, in step S012, the transport pattern calculation portion 16 acquires the work entity situation from the work entity situation acquisition portion 7.

(Step S013)

Subsequently, in step S013, the transport pattern calculation portion 16 acquires the map information from the map information acquisition portion 4.

A sequence in which the transport pattern calculation portion 16 performs the processes of steps S012 and S013 is not particularly limited as long as the sequence is before step S014.

(Step S014)

Subsequently, in step S014, the transport pattern calculation portion 16 calculates a transport pattern and a transport route in each transport pattern with reference to the allocation result supplied from the work entity allocation portion 15, the work entity situation supplied from the work entity situation acquisition portion 7, and the map information supplied from the map information acquisition portion 4. The details of the method of calculating the transport pattern has been described above.

(Step S018)

Subsequently, in step S018, the transport pattern calculation portion 16 determines whether there is a load to which the work entities are not allocated, in other words, determines whether the user can transport all the loads when the work entities are allocated to each load once. When there is a load to which the work entities are not allocated, the number-of-work entities determination portion 200 allocates the work entities a plurality of times by returning the process to step S012 and repeating steps S012 to S018. When there is no load to which the work entities are not allocated, the transport pattern calculation portion 16 supplies the calculated transport pattern to the required time calculation portion 18.

(Step S019)

Subsequently, in step S019, the required time calculation portion 18 calculates a required time of transport of each load in each transport pattern with reference to the transport pattern supplied from the transport pattern calculation portion 16.

(Step S020)

Subsequently, in step S020, the required time calculation portion 18 determines the transport pattern in which the required time is the shortest. The required time calculation portion 18 supplies the determined transport pattern in which the required time is the shortest to the transport plan generation portion 25.

(Step S021)

Subsequently, in step S021, the work entity information acquisition portion 12 acquires the work entity information including an expense of each work entity to the amount calculation portion 14. The amount calculation portion 14 calculates a total amount of the work entities with reference to the expense of each work entity. The amount calculation portion 14 supplies information indicating completion of the calculation of the total amount with regard to a certain introduction number pattern to the introduction number calculation portion 13.

(Step S022)

Subsequently, in step S022, the introduction number calculation portion 13 determines whether the calculation of the transport pattern in which the required time is the shortest and the calculation of the total amount are completed in all the introduction number patterns. When there is the introduction number pattern in which the calculation of the transport pattern in which the required time is the shortest and the calculation of the total amount are not completed, the introduction number calculation portion 13 returns the process to step S004 and repeats the processes of steps S004 to S022. When the introduction number calculation portion 13 determines that the calculation of the transport pattern in which the required time is the shortest and the calculation of the total amount are completed in all the introduction number patterns, the introduction number calculation portion 13 supplies information indicating the completion of the calculation in all the introduction number patterns to the amount calculation portion 14.
(Step S023)

Subsequently, in step S023, the amount calculation portion 14 selects the transport pattern group in which the required time is the shortest among the transport patterns in which the required time calculated in all the introduction number patterns is the shortest. The details of a method of selecting the transport pattern group in which the required time is the shortest has been described above. Further, the amount calculation portion 14 selects the transport pattern in which the total amount of the work entities is the smallest from the transport pattern group in which the required time is the shortest and supplies the transport pattern to the transport plan generation portion 25.
(Step S024)

Subsequently, in step S024, the transport plan generation portion 25 generates the transport plan based on the transport pattern which is supplied from the amount calculation portion 14 and in which the required time is the shortest and the total amount of the work entities is small. The transport plan generation portion 25 supplies the generated transport plan to the delivery plan comparison portion 19.
(Step S025)

Subsequently, in step S025, the delivery plan comparison portion 19 acquires the delivery plan supplied from the delivery plan acquisition portion 3. A sequence in which the process of step S025 is performed is not particularly limited as long as the process is before step S026.
(Step S026)

Subsequently, in step S026, the delivery plan comparison portion 19 compares the transport plan supplied from the transport plan generation portion 25 with the delivery plan supplied from the delivery plan acquisition portion 3 to determine whether the transport plan is able to attain the delivery plan. When the delivery plan comparison portion 19 determines that the transport plan is able to attain the delivery plan, the process of determining the number of work entities ends. Conversely, when the delivery plan comparison portion 19 determines that the transport plan is not able to attain the delivery plan, an error is supplied to the display portion of the control device 30 and the display portion displays the error.

[Realization Example by Software]

Control blocks (in particular, the map information acquisition portion 4, the load information acquisition portion 5, the transport capacity acquisition portion 6, the work entity situation acquisition portion 7, and the number-of-work entities determination portion 200) of the simulator 1 may be realized by a logic circuit (hardware) formed by an integrated circuit (IC chip) or may be realized by software.

In the latter case, the simulator 1 includes a computer that performs a command of a program which is software realizing each function. The computer includes, for example, one or more processors and includes a computer-readable recording medium that stores the program. Then, when the computer causes the processor to read the program from the recording medium and execute the program, an objective of the disclosure is implemented. As the processor, for example, a central processing unit (CPU) can be used. As the recording medium, for example, not only a "non-transitory medium" such as a read-only memory (ROM) but also a tape, a disc, a card, a semiconductor memory, a programmable logic circuit, or the like can be used. A random access memory (RAM) on which the program is loaded may be further included. The program may be supplied to the computer via any transmission medium (a communication network, a broadcast wave, or the like) capable of transmitting the program. According to a form of the disclosure can also be realized in a form of a data signal embedded in broadcast waves in which the program is embodied through electronic transmission.

To solve the foregoing problem, according to Aspect 1 of the disclosure, a simulator includes: a transport capacity acquisition portion configured to acquire a transport capacity of a work entity including a condition of a load which the work entity is able to transport; a load information acquisition portion configured to acquire load information regarding each load; a map information acquisition portion configured to acquire map information; a work entity situation acquisition portion configured to acquire a work entity situation including virtual positional information of each work entity; and a number-of-work entities determination portion configured to determine the number of work entities to satisfy a predetermined condition with reference to the transport capacity, the load information, the map information, and the work entity situation.

In the foregoing configuration, it is possible to realize the simulator capable of determining the number of appropriate work entities.

To solve the foregoing problem, in the simulator according to Aspect 2 of the disclosure, the work entity may include at least one selected from a group formed by moving bodies and people.

In the foregoing configuration, it is possible to realize the simulator capable of determining the appropriate number of moving bodies and/or people.

To solve the foregoing problem, the simulator according to Aspect 3 of the disclosure may further include a work entity information acquisition portion configured to include an expense of the work entity. The number-of-work entities determination portion may calculate a capital investment expense with reference to a determination result regarding the work entity and the expense.

In the foregoing configuration, it is possible to realize the simulator capable of calculating a capital investment expense.

To solve the foregoing problem, in the simulator according to Aspect 4 of the disclosure, the predetermined condition may be within a range of a condition set by a user.

In the foregoing configuration, it is possible to realize the simulator capable of performing simulation so that the condition set by the user is satisfied.

To solve the foregoing problem, in the simulator according to Aspect 5 of the disclosure, the predetermined condition may be that a time taken to transport the load is the shortest.

In the foregoing configuration, the simulator can determine the number of work entities in which a time taken to transport loads is the shortest.

To solve the foregoing problem, the simulator according to Aspect 6 of the disclosure may further include a delivery plan acquisition portion configured to acquire a delivery plan. The number-of-work entities determination portion may generate a delivery plan with reference to a determination result regarding the work entity. Whether the transport plan is able to attain the delivery plan may be determined with reference to the delivery plan.

In the foregoing configuration, it is possible to realize the simulator capable of determining whether the delivery plan can be attained.

To solve the foregoing problem, the simulator according to Aspect 7 of the disclosure may further include a remaining uptime acquisition portion configured to acquire a remaining uptime of the work entity; and a charging station information acquisition portion configured to acquire charging station information regarding whether to charge the work entity. With reference to a remaining uptime of the work entity, the map information, and the charging station information, the number-of-work entities determination portion may calculate a charging route which is a path along which the moving body is moved to a charging station.

In the foregoing configuration, it is possible to automate charging of the work entities.

To solve the foregoing problem, in the simulator according to Aspect 8 of the disclosure, the charging station information may include the number of work entities which is able to be charged.

In the foregoing configuration, it is possible to realize the simulator capable of planning charging in consideration of the number of work entities which can be charged.

To solve the foregoing problem, in the simulator according to Aspect 9 of the disclosure, the charging station information may include a power capacity which each charging station is able to supply.

In the foregoing configuration, it is possible to realize the simulator capable of planning charging in consideration of a power capacity necessary for charging.

To solve the foregoing problem, in the simulator according to Aspect 10 of the disclosure, the number-of-work entities determination portion may calculate the charging route of the work entities of which the virtual remaining uptime is equal to or less than a constant value.

In the foregoing configuration, it is possible to realize the simulator capable of planning charging of work entities more efficiently.

To solve the foregoing problem, in the simulator according to Aspect 11 of the disclosure, the transport capacity may include weight of a load which the work entity is able to transport. The load information may include information regarding weight of each load.

In the foregoing configuration, it is possible to realize the simulator capable of simulating transport of a load using a work entity in which the weight of a transportable load is limited.

To solve the foregoing problem, in the simulator according to Aspect 12 of the disclosure, the work entity may include an unmanned aircraft.

In the foregoing configuration, it is possible to realize the simulator capable of planning transport with advantages of an unmanned aircraft.

To solve the foregoing problem, in the simulator according to Aspect 13 of the disclosure, the work entity may be a plurality of kinds of work entities.

In the foregoing configuration, it is possible to realize the simulator capable of planning more efficient transport than when the plurality of kinds of work entities is used.

To solve the foregoing problem, according to Aspect 14 of the disclosure, a control device includes: a transport capacity acquisition portion configured to acquire a transport capacity of a work entity including a condition of a load which the work entity is able to transport; a load information acquisition portion configured to acquire load information regarding each load; a map information acquisition portion configured to acquire map information; a work entity situation acquisition portion configured to acquire a work entity situation including virtual positional information of each work entity; a number-of-work entities determination portion configured to determine the number of work entities to satisfy a predetermined condition with reference to the transport capacity, the load information, the map information, and the work entity situation; and a control portion configured to control a work entity with reference to a determination result regarding the work entity.

In the foregoing configuration, it is possible to realize the control device capable of determining the number of appropriate work entities.

To solve the foregoing problem, according to Aspect 15 of the disclosure, a simulation program is a simulation program that causes a computer to function as a simulator according to any one of Aspects 1 to 13 and causes the computer to function as: the transport capacity acquisition portion, the load information acquisition portion, the map information acquisition portion, the work entity situation acquisition portion, and the number-of-work entities determination portion.

In the foregoing configuration, the same advantages as those of Aspect 1 are obtained.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A control device comprising:
one or more processors configured to:
  acquire a transport capacity of each of a plurality of work entities including a condition of loads configured to be transported by each of the plurality of work entities, wherein each transport capacity comprises a maximum weight of the loads which can be transported by each of the plurality of work entities, wherein the one or more processors calculate the maximum weight of the loads using a quantifying method;
  acquire load information regarding each load of the loads, wherein the load information comprises a number of the loads in a warehouse representing a certain season and data regarding a seasonal variation in the number of the loads in the warehouse when compared to a past number of loads in the warehouse representing one or more previous seasons;
  acquire map information of the warehouse;
  acquire a work entity situation including positional information of each work entity of the plurality of work entities in the warehouse located at a certain time point based on a result during a simulation;
  determine a quantity of work entities as a determination result to satisfy a plurality of predetermined conditions set by a user who operated the control device with reference to the transport capacity of each of the plurality of work entities, the load information, the map information, and the work entity situation, wherein the plurality of predetermined conditions are based on: (1) comparing an expected time taken by a certain work entity of the plurality of work entities to transport each load of the loads to a shortest expected time from among the plurality of work entities,(2) comparing an expected expense for the certain work entity of the plurality of work entities to transport each load of the loads to a smallest expected expense from among the plurality of work entities, and/or (3) comparing an entity composite score based on a weighted consideration of both the expected time and the expected expense associated with the certain work entity of the plurality of work entities to transport each load of the loads to a smallest entity composite score from among the plurality of work entities, and control the plurality of work entities to execute a transport plan generated based on the determination result and in which each of the plurality of work entities executing the transport plan are controlled to transport one or more loads of the loads, wherein the plurality of work entities comprises a plurality of first work entities and a plurality of second work entities, wherein each of the plurality of first work entities is configured to transport a single load of the loads, wherein each of the plurality of second work entities is configured to transport a plurality of loads of the loads, wherein the one or more processors are configured to include in the transport plan at least a particular one of the plurality of second work entities having the shortest expected time, the smallest expected expense, or the smallest entity composite score to transport the plurality of loads from among the plurality of second work entities, and wherein the plurality of work entities do not include people.

2. The control device according to claim 1, wherein the one or more processors are configured to calculate the expected expense of each of the plurality of work entities, and wherein the one or more processors are configured to calculate a capital investment expense with reference to the determination result regarding the plurality of work entities and each of the expected expenses.

3. The control device according to claim 1, wherein the one or more processors are configured to acquire a delivery plan with reference to the delivery plan.

4. The control device according to claim 1, wherein each of the plurality of work entities executing the transport plan utilize onboard stored charge while executing the transport plan, wherein the onboard stored charge is in the form of electrical energy and/or chemical energy, and wherein charging a particular work entity increases the onboard stored charge of the particular work entity, and wherein the one or more processors are configured to:
acquire a remaining uptime of each of the plurality of work entities executing the transport plan based on each respective amount of the onboard stored charge of each of the plurality of work entities executing the transport plan; and
acquire charging station information regarding one or more charging stations and whether there is a need to charge each of the plurality of work entities executing the transport plan at the one or more charging stations while executing the transport plan, wherein, with reference to the remaining uptime of each of the plurality of work entities executing the transport plan, the map information, and the charging station information, the one or more processors are configured to calculate a charging route along which one or more of the plurality of work entities executing the transport plan follow to reach the one or more charging stations reachable by each of the plurality of work entities executing the transport plan.

5. The control device according to claim 4, wherein the charging station information includes a maximum quantity of the plurality of work entities executing the transport plan capable of being charged at each of the one or more charging stations at any given time.

6. The control device according to claim 4, wherein the charging station information includes an electrical energy supply capability and/or a chemical energy supply capability of each of the one or more charging stations.

7. The control device according to claim 4, wherein the one or more processors are configured to calculate the charging route for any one or more of the plurality of work entities executing the transport plan whenever the remaining uptime of a particular work entity of the plurality of work entities executing the transport plan is equal to or less than a predetermined threshold value.

8. The control device according to claim 1, wherein the plurality of work entities include an unmanned aircraft.

9. The control device according to claim 1, wherein the plurality of work entities include a plurality of work entity types.

10. The control device according to claim 1, wherein the one or more processors are configured to include in the transport plan at least a particular one of the plurality of first work entities having the shortest expected time, the smallest expected expense, or the smallest entity composite score to transport the single load of the loads from among the plurality of first work entities.

11. A non-transitory computer-readable recording medium comprising a simulation program causing a computer to:
acquire a transport capacity of each of a plurality of work entities including a condition of loads configured to be transported by each of the plurality of work entities, wherein each transport capacity comprises a maximum weight of the loads which can be transported by each of the plurality of work entities, wherein the computer calculates the maximum weight of the loads using a quantifying method;
acquire load information regarding each load of the loads, wherein the load information comprises a number of the loads in a warehouse representing a certain season and data regarding a seasonal variation in the number of the loads in the warehouse when compared to a past number of loads in the warehouse representing one or more previous seasons;
acquire map information of the warehouse;
acquire a work entity situation including positional information of each work entity of the plurality of work entities in the warehouse located at a certain time point based on a result during a simulation;
determine a quantity of work entities as a determination result to satisfy a plurality of predetermined conditions set by a user who operated the computer with reference to the transport capacity of each of the plurality of work entities, the load information, the map information, and the work entity situation, wherein the plurality of predetermined conditions are based on: (1) comparing an expected time taken by a certain work entity of the plurality of work entities to transport each load of the loads to a shortest expected time from among the plurality of work entities, (2) comparing an expected expense for the certain work entity of the plurality of work entities to transport each load of the loads to a smallest expected expense from among the plurality of work entities, and/or (3) comparing an entity composite score based on a weighted consideration of both the expected time and the expected expense associated with the certain work entity of the plurality of work entities to transport each load of the loads to a smallest entity composite score from among the plurality of work entities; and control the plurality of work entities to execute a transport plan generated based on the determination result and in which each of the plurality of work entities executing the transport plan are controlled to transport one or more loads of the loads, wherein the plurality of work entities comprises a plurality of first work entities and a plurality of second work entities, wherein each of the plurality of first work entities is configured to transport a single load of the loads, wherein each of the plurality of second work entities is configured to transport a plurality of loads of the loads, wherein the computer is configured to include in the transport plan at least a particular one of the plurality of second work entities having the shortest expected time, the smallest expected expense, or the smallest entity composite score to transport the plurality of loads from among the plurality of second work entities, and wherein the plurality of work entities do not include people.

12. The medium according to claim 11, wherein the computer is configured to calculate the expected expense of each of the plurality of work entities, and wherein the computer is configured to calculate a capital investment expense with reference to the determination result regarding the plurality of work entities and each of the expected expenses.

* * * * *